June 24, 1941.
F. S. KUMMER
2,246,921
ELEVATOR POSITION INDICATOR
Filed March 27, 1940
2 Sheets-Sheet 1
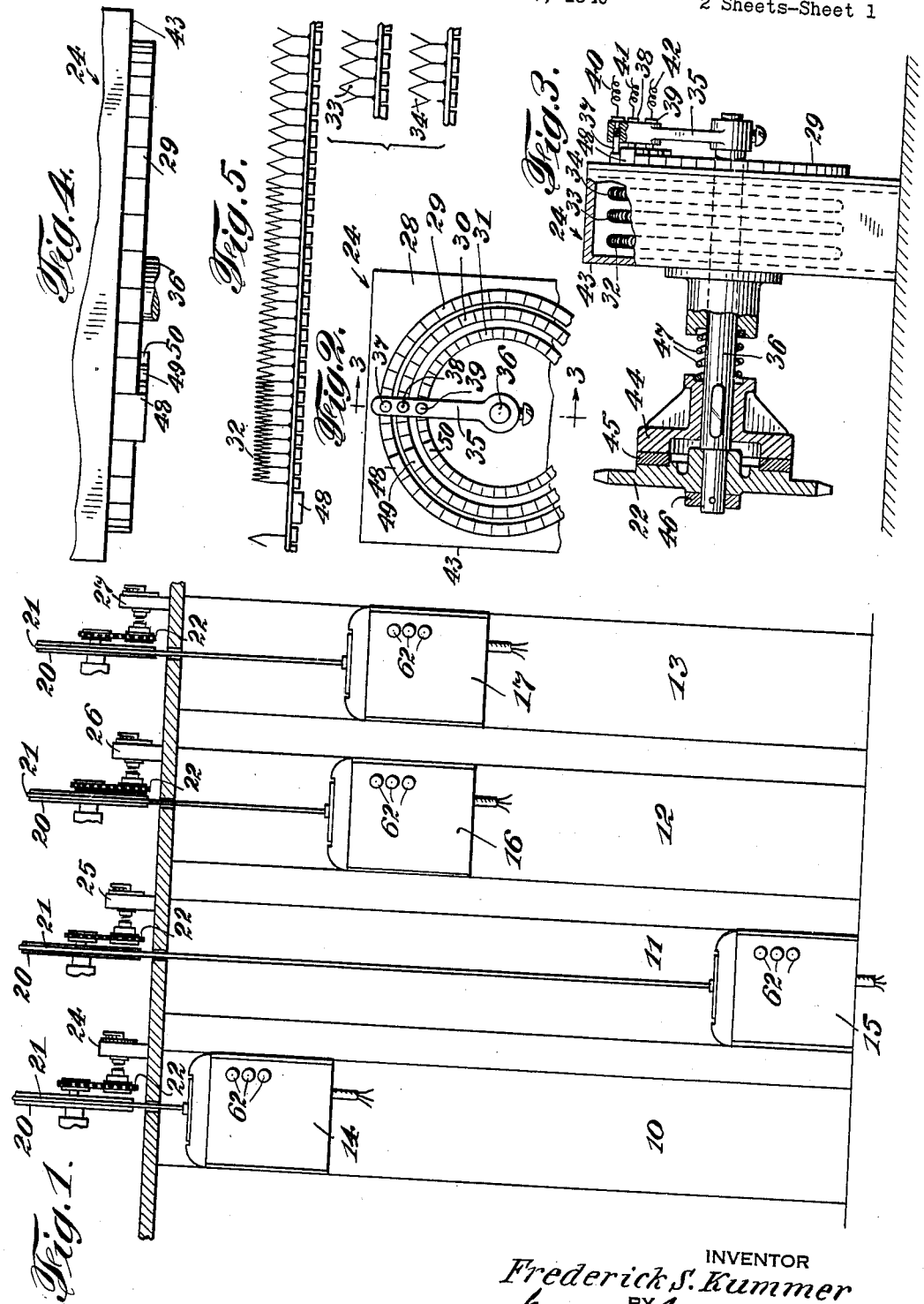
INVENTOR
Frederick S. Kummer
BY
his ATTORNEY

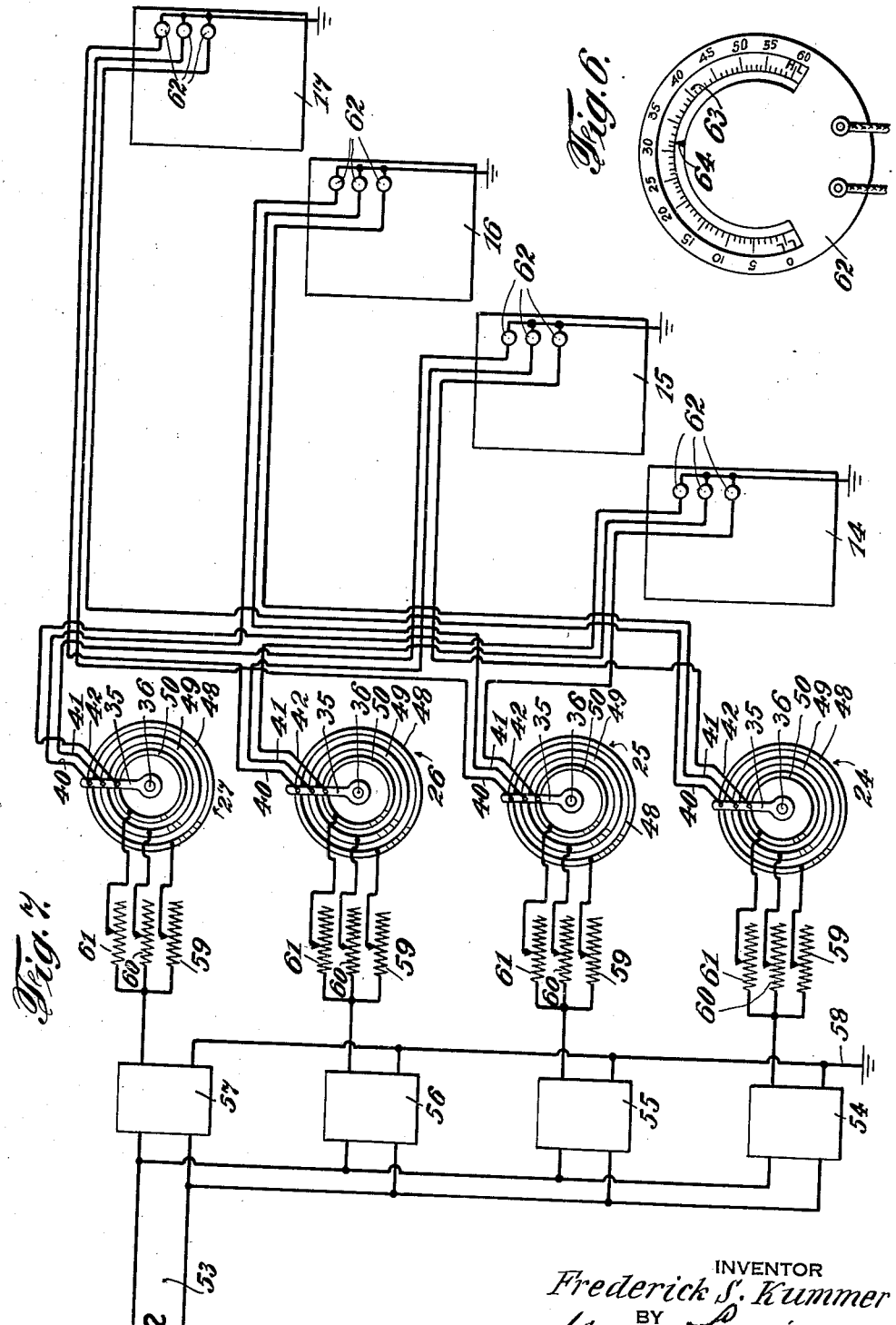

Patented June 24, 1941

2,246,921

UNITED STATES PATENT OFFICE 2,246,921

ELEVATOR POSITION INDICATOR

Frederick S. Kummer, New York, N. Y., assignor to Econoscope Corporation, New York, N. Y., a corporation of New York Application March 27, 1940, Serial No. 326,151

2 Claims. (Cl. 177—336)

The invention relates to position-indicator means for elevators as utilized more especially in connection with the operation of a bank of elevators comprising more than two cars.

It is an object of the present invention to provide an electrical indicating system for use with such bank of cars whereby the operator of any one car may quickly ascertain the location of any other car or cars of the bank of cars.

A further object of the invention is to effect such indication by means of a plurality of electrical measuring instruments which are to be located in the operated car—one instrument for each of the associated cars.

A still further object of the invention is to provide means operated by a moving car for varying the resistances of electrical circuits in which measuring instruments representing said car are included, there being interposed between the car and said means a slippage element so that any over-travel of the car or its driving mechanism will be without effect on the measuring instruments.

In carrying out the invention there is located in each car a group of electrical measuring instruments, such as an ammeter, and in number one less than the total number of cars of the bank; but, if it should be desired to provide at some other location an indication of the position of the particular car being operated, additional instruments may be provided. The individual instruments are connected in series in respective electrical circuits which include also variable resistors, said resistors being grouped for operation by the respective cars with the individual resistors of any group, jointly operated by a particular car, connected respectively to one instrument of each of the other cars of the bank. The resistance of each resistor of a group will thus be varied in accordance with the position of the operated car, and the circuits of the instruments correspondingly affected for affording the proper indication by said instruments.

A source of substantially constant voltage is applied to each circuit, and the current developed therein for actuating the particular instrument of such circuit will thus be influenced by the value of the resistance of such circuit as altered by a variable resistor. It is understood that a separate and distinct instrument and circuit, with resistor, constitute the indicating arrangement for a car, as no accurate indication would be attainable upon a single instrument switched to the respective circuits, nor could the same afford a simultaneous indication of the different positions of the various other cars.

Provision is made, also, to accommodate over-travel by a car and/or its driving mechanism so that the instruments may always register the correct position of a car provided, of course, that no substantial variation of the voltage occurs. This, also may be accommodated by a further adjustable resistance located in each of the electrical circuits.

The novel system enables, also, additional or reserve cars which may not be equipped with instruments to replace temporarily a car of the bank with the position of the substituted car readable in the remaining cars of the bank. Of course, such reserve car not being equipped with instruments, the operator thereof would be without knowledge of the locations of said remaining cars.

The nature of the invention, however, will best be understood when described in connection with the accompanying drawings, in which:

Figure 1 is a diagrammatic view of a bank of elevators of four cars, each bearing position-indicating instruments.

Figure 2 is a front elevation of variable resistor means.

Figure 3 is a side elevation thereof, with portion of the casing broken away, together with a longitudinal section of operating means therefor.

Figure 4 is an enlarged fragmentary plan view illustrating the contact elements and an associated stop element; and Figure 5 is a fragmentary developed view of the same and resistance elements.

Figure 6 is a front elevation of a measuring instrument used in the individual cars.

Figure 7 is a wiring diagram of the novel system.

Referring to the drawings, 10, 11, 12, and 13 represent elevator shafts in which the cars 14, 15, 16, and 17 travel. These cars are designed to travel up and down their shafts in the usual manner by mechanism (not shown) except for the sheaves 20 and cables 21 thereof. From the former, which is shown located above the elevator shafts, connection is made to a pulley 22 to rotate the same at a definite ratio with respect to the sheave 20 and for the purpose of operating the position-indicator system, as hereinafter set forth. In the operation of this system, there are utilized resistor members operated from the different pulleys 22, and one resistor member is provided for each of the cars, namely: resistor members 24, 25, 26, and 27, respectively, for the cars 14, 15, 16, and 17.

Each of these resistor members comprises a group of individual resistors in number one less than the number of cars constituting the bank of cars. These individual resistors are grouped and arranged preferably concentrically on a support 28 and, for example, as indicated in the present embodiment, they comprise the three resistors 29, 30 and 31. Each resistor, moreover, includes a plurality of adjacently disposed contact elements which are insulated from one another and have connected therebetween resistance elements 32, 33 and 34, respectively, whereby the total resistance varies progressively along the contacts. An arm 35 is mounted to move angularly over the various resistors, being supported coaxially therewith as on a shaft 36 with which it moves and on which shaft is carried also the pulley 22 driven from an elevator mechanism. This arm bears brushes 37, 38, and 39 designed to travel over the different contacts of the respective resistors 29, 30, and 31; and from these brushes leads 40, 41, and 42 are taken to electrical measuring means hereinafter set forth.

The resistance elements 32, 33, and 34 are conveniently housed in a suitable casing 43 through which the shaft 36 extends, said shaft having externally of the casing and slidably mounted thereon for rotation therewith one half 44 of a clutch element, the other half 45 being rotated by the pulley 22 which is loosely mounted for rotation on the said shaft and held thereon by a collar 46. A spring 47 coiled about the shaft between the casing 43 and the clutch half 44 urges the latter normally into contact with the clutch half 45 and as a result of which rotation of pulley 22 will be communicated to the shaft 36 and through it will rotate the arm 35. The coacting surfaces of the clutch halves are suitably roughened or padded with material affording sufficient friction to transmit the rotation of pulley 22 through the clutch to the arm 35. The latter, however, is designed to be stopped at the limit of its allowable travel over the contact elements of the resistors as through engagement with stops 48, 49, and 50, positioned in the same radius in each of the concentrically disposed resistor elements, although all but one of the stops may be omitted. This will insure that the arm 35 does not overtravel in its movement over the individual contact elements of a resistor, which elements correspond, as will hereinafter be set forth, to the different landings of a car in its shaft. Overtravel of a car in a shaft and/or its driving mechanism will thus have no effect on the limit positions of the arm 35 since the clutch halves will then merely slip relatively to each other.

Reference being had more particularly to Figures 6 and 7 of the drawings, the conductors or leads from the respective brushes carried by a resistor arm are brought to the different cars in the following manner, power being supplied to the different resistor members 24, 25, 26, and 27 from a suitable source of current 53, preferably alternating, and through individual transformers indicated at 54, 55, 56, and 57, respectively. One side of the secondaries of all the transformers is grounded as through the common lead 58; and the other leads therefrom are connected to the respective resistors of a group with intermediate variable resistors 59, 60, and 61 for adjustment to the desired constant potential in initially setting the individual instruments, which may be of the electrical measuring type such as an ammeter 62, Figure 6 of the drawings.

These instruments are arranged in groups in the respective cars, the number of instruments in each group provided for a car being one less than the number of cars in the bank. Each instrument bears a scale 63 graduated to correspond progressively with the resistance values of the resistances intermediate the contacts of a resistor, and the graduations will therefore afford an indication of the landings through cooperation with a pointer 64 of the instrument and which is set initially by manipulating a resistor 59, 60, or 61 as may be required.

The operating electrical movement for this pointer is connected with the ground and with the corresponding lead from a resistor brush 37, 38, and 39, so that the current flowing through the particular resistor will cause a said pointer to be positioned in accordance with the resistance of the circuit including the particular resistor and instrument. For example, with respect to resistor member 24, the particular leads 40, 41, and 42 are connected respectively to one of the instruments in the car 15, one of the instruments in the car 16, and one of the instruments in the car 17. No connection, however, is had to the particular car 14 being operated and which controls the said resistor member 24, but whose position will thereby be denoted on the different instruments of the remaining cars. Similarly, the resistor members 25, 26, and 27 are connected each to one instrument of the cars other than the car operating the particular resistor member.

What I claim is:

1. In an elevator-position indicator system, the combination with a bank of more than two cars; of a plurality of electrical measuring instruments grouped in each car, the different instruments of a group corresponding respectively to cars other than the car bearing the particular group and each instrument being graduated for car landings, a source of substantially constant voltage connected with each of the instruments of the different groups, together with variable resistors associated with the respective cars and located respectively intermediate the voltage source and instruments, individual resistors being matched to their respective instruments as to landing graduations and arranged into groups each of which comprises resistors controlling the instruments in cars other than the one with which a particular resistor group is associated, and independent means for each car operated therefrom for varying jointly and similarly in accordance with the position of a car the associated resistors of a group.

2. In an elevator-position indicator system, the combination with a bank of more than two cars; of a plurality of electrical measuring instruments grouped in each car, in number one less than the total number of cars, the different instruments of a group corresponding respectively to cars other than the car bearing the particular group and each instrument being graduated for car landings, a source of substantially constant voltage connected with each of the instruments of the different groups, together with variable resistors associated with the respective cars and located respectively intermediate the voltage source and instruments, individual resistors being matched to their respective instruments as to landing graduations and arranged into groups each of which comprises resistors, in number one less than the total number of cars, controlling the instruments in cars other than the one with which a particular resistor group is associated, and independent means for each car operated therefrom for varying jointly and similarly in accordance with the position of a car the associated resistors of a group.

FREDERICK S. KUMMER.